(12) United States Patent
Wipiejewski et al.

(10) Patent No.: US 7,050,689 B2
(45) Date of Patent: May 23, 2006

(54) PHOTONIC DEVICE WITH SEGMENTED ABSORPTION DESIGN

(75) Inventors: Torsten Wipiejewski, Kowloon (HK); Peter Kozodoy, Santa Barbara, CA (US)

(73) Assignee: Agility Communications, Inc., Goleta, CA (US)

( * ) Notice: Subject to any disclaimer, the term of this patent is extended or adjusted under 35 U.S.C. 154(b) by 68 days.

(21) Appl. No.: 10/723,976

(22) Filed: Nov. 26, 2003

(65) Prior Publication Data

US 2004/0109658 A1   Jun. 10, 2004

Related U.S. Application Data

(60) Provisional application No. 60/429,132, filed on Nov. 26, 2002.

(51) Int. Cl.
  *G02B 6/10* (2006.01)
(52) U.S. Cl. .................. 385/129; 385/131; 385/122; 372/36
(58) Field of Classification Search ............. 385/122, 385/129–132; 372/6, 36
  See application file for complete search history.

(56) References Cited

U.S. PATENT DOCUMENTS

| 6,574,259 B1 | 6/2003 | Fish et al. |
| 6,614,819 B1 | 9/2003 | Fish et al. |
| 6,628,690 B1 | 9/2003 | Fish et al. |
| 6,667,999 B1 * | 12/2003 | Hasson et al. ............... 372/36 |
| 6,819,845 B1 * | 11/2004 | Lee et al. .................. 385/122 |

OTHER PUBLICATIONS

H. Tanaka et al., "Temperature dependence and input optical power tolerance of an InGaAsP electroabsorption modulator module," 1996. Optical and Quantum Electronics, 28:605-612.
Aimez, V., et al., "Low-energy ion-implantation-induced quantum-well intermixing," IEEE Journal of Selected Topics in Quantum Electronics, 8:870-879, 2002.
Allard, M., et al., "Temperature determination in optoelectronic waveguide modulators," Journal of Lightwave Technology, 18:813-818, 2000.
Binn, Z., et al., "High-power operation of electro-absorption modulators," Applied Physics Letters, 83:3605-3607, 2003.
Classsen. M., et al., " Two-section electro-absorption modulator with negative chirp at low insertion loss," Electronics Lett, 32:2121-2122, 1996.

(Continued)

*Primary Examiner*—Frank G. Font
*Assistant Examiner*—Eric Wong
(74) *Attorney, Agent, or Firm*—Gates & Cooper LLP

(57) ABSTRACT

A photonic device designed with an intermittent absorption profile along a waveguide. The absorption profile is divided into low-absorption and high-absorption segments that are distributed axially in order to decrease the maximum local temperature in the device. The distribution of low-absorption segments can be controlled through techniques such as proton implantation or selective-area quantum well intermixing. The lengths of low-absorption and high-absorption segments can be adjusted to optimize heat dissipation along the device length.

44 Claims, 12 Drawing Sheets

OTHER PUBLICATIONS

Hamoudi, A., et al., "Controlled disordering of compressively strained InGaAsP multiple quantum wells under SiO:P encapsulant and application to laser-modulator integration," Journal of Applied Physics, 78:5638-5641, 1995.

Jasmin, S., et al., "Diluted- and distributed- absorption microwave waveguide photodiodes for high efficiency and hogh power," IEEE Transactions on Microwave Theory and Techniques, 45:1337-1341, 1997.

Mason, B., et al., "40-Gb/s Tandem Electro-absorption Modulator," IEEE Photon. Techn. Lett., 14:27-29, 2002.

Murthy, S., et al., "A novel monolithic distributed traveling-wave photodetector with parallel optical feed," IEEE Photonics Technology Letters, 12:681-683, 2000.

Nespola, A., et al., "Analysis of failure mechanisms in velocity-matched distributed photodetectors," IEE Proc. Optoelectron, 146:25-30, 1999.

Shi, J.-W., et al., "Theory and design of a tapered line distributed photodetector," Journal of Lightwave Technology, 20:1942-1950, 2002.

Wipiejewski, T., et al., "Improved Performance of Vertical-Cavity Surface-Emitting Laser Diodes with Au-Plated Heat Spreading Layer," Electronics Lett, 31:279-281, 1995.

Wipiejewski, T., et al., "Monolithic Integration of a Widely Tunable Laser Diode with a High Speed Electro-Absorption Modulator," 52nd ECTC, San Diego, May 2002.

* cited by examiner

PHOTONIC DEVICE WITH SEGMENTED ABSORPTION DESIGN

CROSS-REFERENCE TO RELATED APPLICATIONS

This application claims the benefit under 35 U.S.C. §119 (e) of co-pending and commonly-assigned U.S. provisional patent application Ser. No. 60/429,132, filed Nov. 26, 2002, by Torsten Wipiejewski, and entitled "ELECTRO-AB-SORPTION MODULATOR WITH SEGMENTED ABSORPTION DESIGN," which application is incorporated by reference herein.

BACKGROUND OF THE INVENTION

1. Field of the Invention

This invention relates to optoelectronic components, and more particularly, to a waveguide-based optically absorbing device.

2. Description of the Related Art (Note: This application references a number of different patents, applications and/or publications as indicated throughout the specification by reference numbers enclosed in brackets, e.g., [x]. A list of these different patents, applications and/or publications ordered according to these reference numbers can be found below in the section entitled "References." Each of these patents, applications and/or publications is incorporated by reference herein.)

Photonic devices that absorb laser light play a critical role in modem high speed optical transmission systems. Examples of such devices include electro-absorption modulators, waveguide photodetectors, and semiconductor Mach-Zender modulators. In these devices, an electric field is applied across a waveguide layer to change the absorption characteristics of the semiconductor material. Normally, the waveguide is embedded in a pn-junction of semiconductor material to apply the field and is itself either undoped or slightly p-type or n-type doped. The waveguiding properties of the device are typically controlled by fashioning the upper cladding layer into a narrow ridge. The modulators and photodetectors are sometimes monolithically integrated with laser diodes, or widely tunable laser diodes. [1], [2].

If the waveguide layer is reasonably thick, the Franz-Keldysh effect causes the change in absorption with electric field. In the case of quantum well material, the Quantum Confined Stark effect causes the change in the absorption behavior. In both cases, the electric field causes an increased absorption for wavelengths below the bandgap energy. The amount of absorption increase depends on the applied electric field strength and the energy separation of the incoming light to the bandgap energy of the semiconductor.

A constant absorption coefficient in the waveguide layer will cause the light intensity to decrease in an exponential way as the light progresses through the device. The highest amount of light absorption therefore occurs at the front of the device, where the light intensity is highest. The absorbed light generates a photo-induced current that causes a local heating of the device. Because the light intensity decreases along the device, so does the photocurrent, and therefore also the local heating. Thus, the heating is the strongest at the front of the device structure.

In a simple device design, the heat that is generated in the waveguide layer is dissipated predominantly into the substrate. The thermal resistance between the waveguide section and the substrate determines the magnitude of the temperature increase resulting from the dissipated electrical power. Since the dissipated power is highest at the front of the device, the temperature rise is also the highest at the front and decreases along the length of the device. Strong heating at the front of the device will cause a local increase of the absorption coefficient of the semiconductor material due to bandgap shrinkage. This increase of the absorption coefficient further increases the amount of light absorbed per unit length, creating a positive feedback effect that can significantly enhance the local temperature rise at the front of the device. [3] This feedback cycle can cause a thermal runaway, resulting in a catastrophic device failure. [4] Even if the device does not fail immediately, high local temperatures during operation can negatively impact the long term device reliability. A device design with a more evenly distributed light absorption would be highly desirable. This would result in a temperature profile that is not as strongly peaked at the device input, and in a lower peak temperature for a given optical input power. Since the peak temperature limits the power handling capability of the device, such a design would also extend the power capability of the photodetector or modulator device under consideration. [5]

One approach to reduce the peak temperature is to use a thick metal contact layer as a heat spreader. A similar approach has been employed in vertical-cavity surface-emitting laser diodes (VCSELs) to decrease the thermal resistance effectively. [6] For the waveguide photodetectors and modulators under consideration, the use of thick metal will help to reduce the peak temperature somewhat by enhancing heat flow away from the point of maximum generation at the input of the device. Nonetheless, values of the local temperature rise under operation can remain quite high, and the heat generation remains peaked at the device input.

Distributed absorption devices have been investigated in the past for photodetector applications. These investigations were primarily motivated by the desire to reduce peak absorption in order to avoid carrier-screening effects that can compromise device linearity. However, distributed absorbers also help to reduce temperature peaking. [7] S. Jasmin, et. al., have demonstrated a device in which the waveguide geometry is varied along the longitudinal axis to control the optical confinement factor, and therefore the optical absorption. [8] Other researchers have relied on using multiple separate waveguide photodetectors, grouped in series or in parallel, that are connected by a velocity-matching electrode structure. Techniques used to control absorption in the different detectors have included fabricating multimode interferometers to split the light into parallel optical paths to feed separate detectors [9], or connecting series photodetectors via a resistor network to limit the photocurrent produced in each section. [10]

These designs all add extra fabrication complexity to the device. In addition, many of the structures are only compatible with a velocity-matching traveling-wave electrode structure. In contrast, the present invention comprises a novel method for heat reduction through segmented absorption within a single device structure. The fabrication complexity is kept to a minimum, and the device is compatible with either lumped-electrode or velocity-matched electrode configurations.

SUMMARY OF THE INVENTION

A photonic device designed with an intermittent absorption profile along a waveguide. The absorption profile is divided into low-absorption and high-absorption segments that are distributed axially in order to decrease the maximum local temperature in the device. The distribution of low-absorption segments can be controlled through techniques such as proton implantation or selective-area quantum well intermixing. The lengths of low-absorption and high-absorption segments can be adjusted to optimize heat dissipation along the device length.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

In the present invention, the total light absorption of a waveguide optical element is spread axially through the use of segments in which the absorption coefficient alternates between a large and a small value. Light absorption, and therefore generated photocurrent, is high in segments with a large absorption coefficient. By inserting low-absorption or non-absorption segments, the heat generated by the photocurrent is allowed to dissipate in a more efficient manner, reducing the overall temperature of the device and the degree of temperature non-uniformity.

Figure 1:
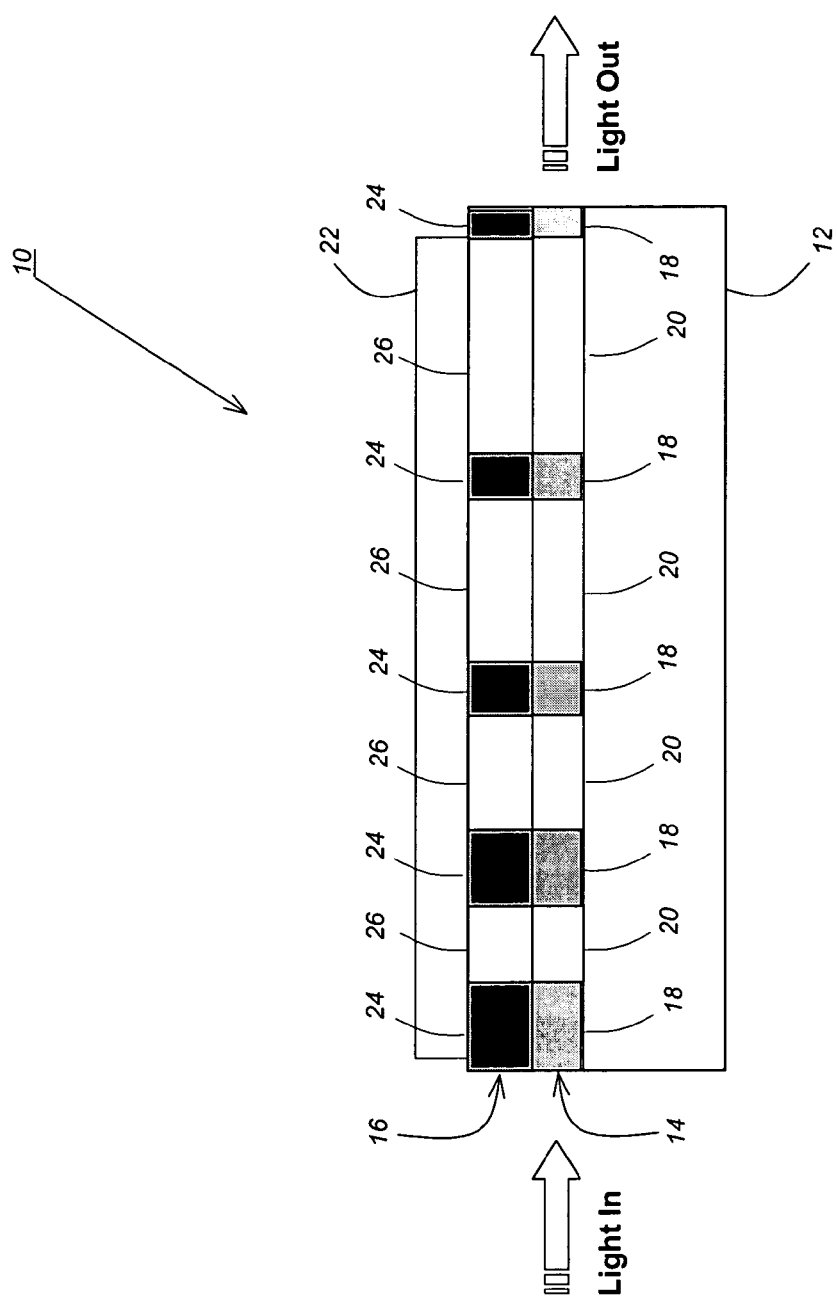
FIG. 1 illustrates the cross-section, along the ridge, of a device with a segmented absorption design.
Figure 2:
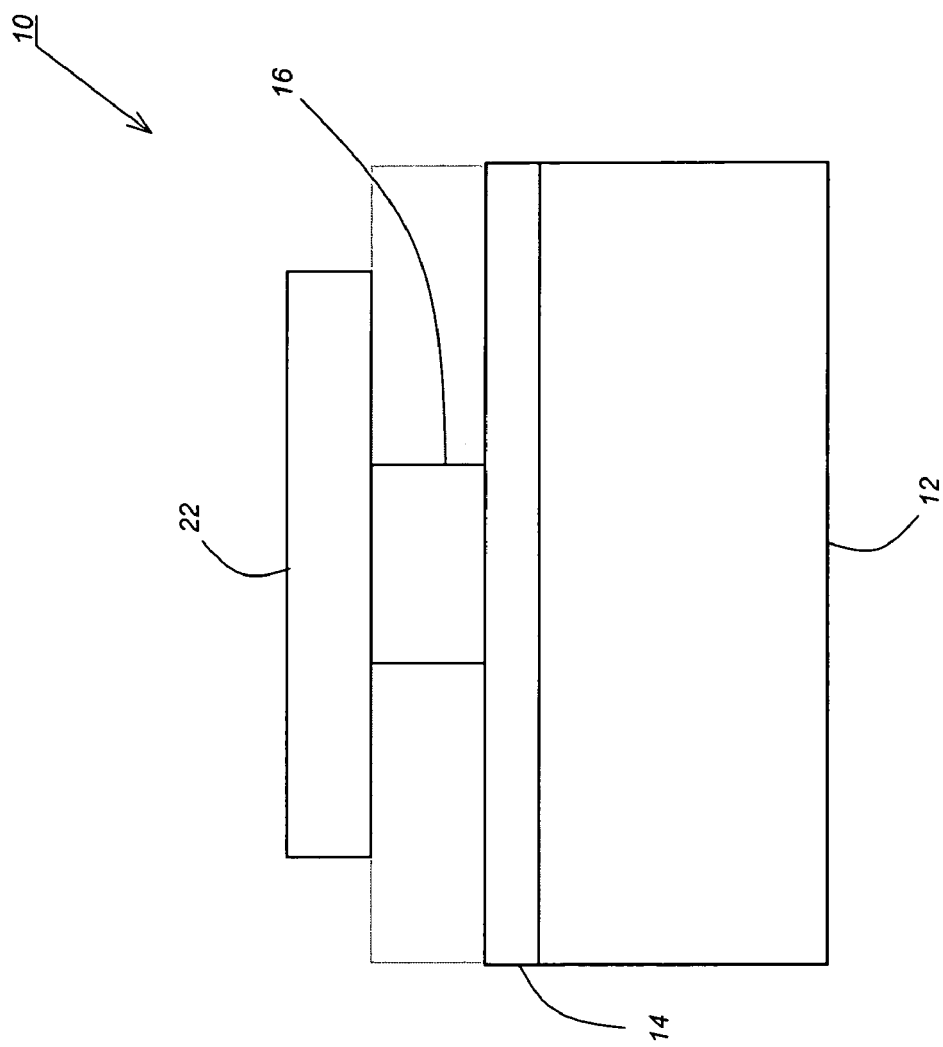
FIG. 2 illustrates the cross-section, perpendicular to the ridge, of a device with a segmented absorption design.
Figure 3:
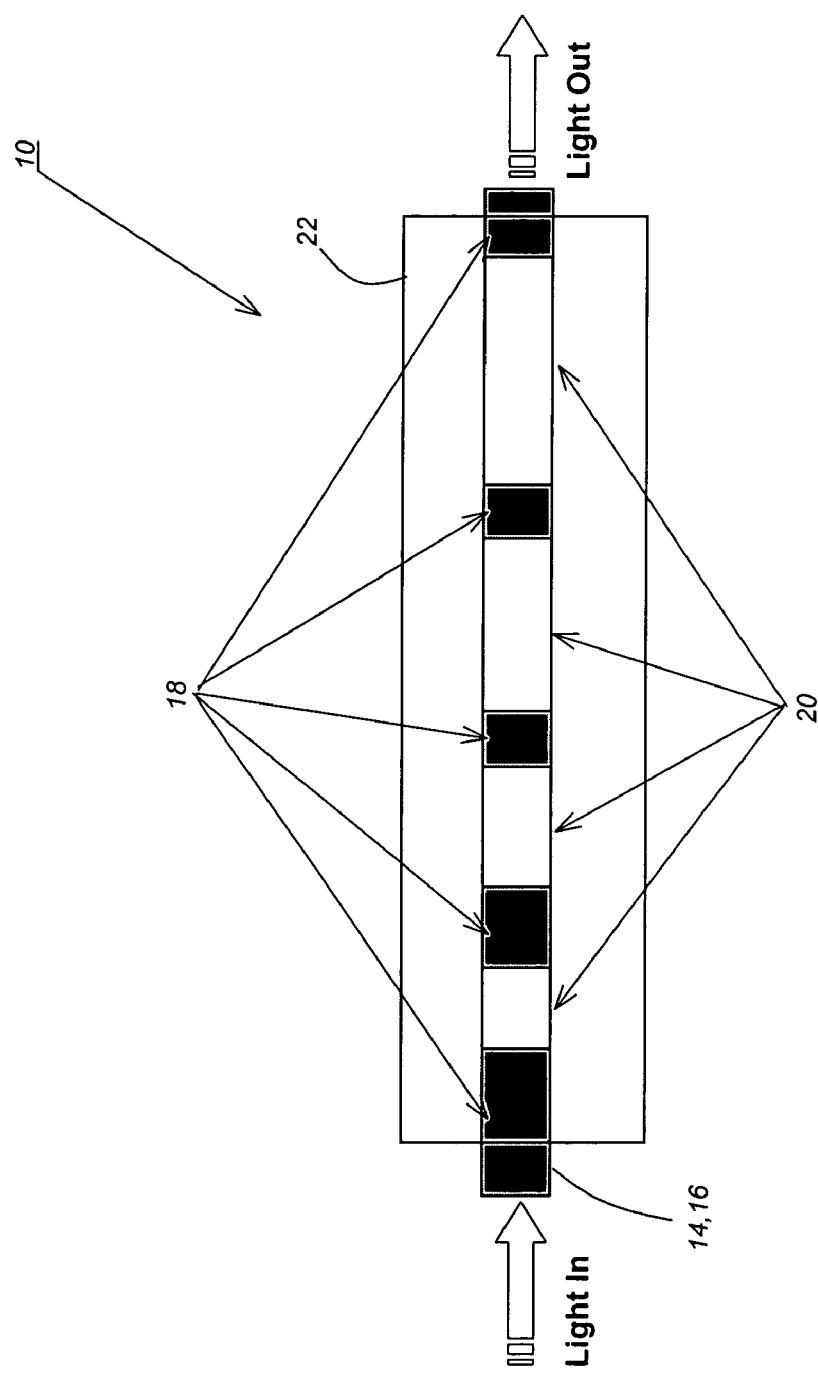
FIG. 3 illustrates a plan view of a device with a segmented absorption design.

FIGS. 1, 2, and 3 show cross-section and plan view schematics of a photonic circuit element or device 10 according to the preferred embodiment of the present invention. The device 10 generally includes a substrate 12, waveguide 14 and ridge cladding layer 16, and could be used as an electro-absorption modulator (EAM) or a waveguide photodetector. The waveguide 14 may be comprised either of a bulk material or a quantum well material.

A photo-induced current generates heat in the device 10. In order to effectively decrease the heat, the waveguide 14 is divided into a plurality of different absorption segments, wherein the absorption segments 18, 20 include one or more non-absorption or low-absorption segments 18 and one or more high-absorption elements 20. A metal contact layer 22 extends on top of the implanted area of the ridge cladding layer 16 of the device 10 in order to improve heat distribution in an axial direction along the ridge 16. The thickness and composition of the metal in layer 22 can be optimized for a specific design. For example, a thick gold-plated electrode might be employed to take advantage of the improved heat spreading capability of the thick metal.

The high-absorption segments 20 and low-absorption segments 18 of the waveguide 14 may be defined using a variety of possible techniques. In one embodiment, the low-absorption segments 18 are defined by proton implantation into area 24 of ridge cladding layer 16 that lies above the low-absorption segment 18. The high-absorption segments 20 are defined by a lack of proton implantation in area 26 of ridge cladding layer 16 that lies above the high-absorption segment 20. The single metal contact layer 22 extends on top of the both the implanted regions 24 and the unimplanted regions 26 of the ridge 16. The implantation process causes the implanted area 24 to become highly resistive. The bias voltage of the metal electrode 22 can therefore only reach through to the light conducting waveguide layer 14 in the non-implanted areas 26 of the device 10. It is therefore only in the segments 20 of the waveguide 14, lying adjacent to non-implanted cladding sections 26, that the applied voltage will enhance light absorption by inducing an electrical field in the waveguide material 14. In the waveguide segments 18, lying adjacent to implanted cladding sections 24, the absorption coefficient remains small.

Figure 4A:
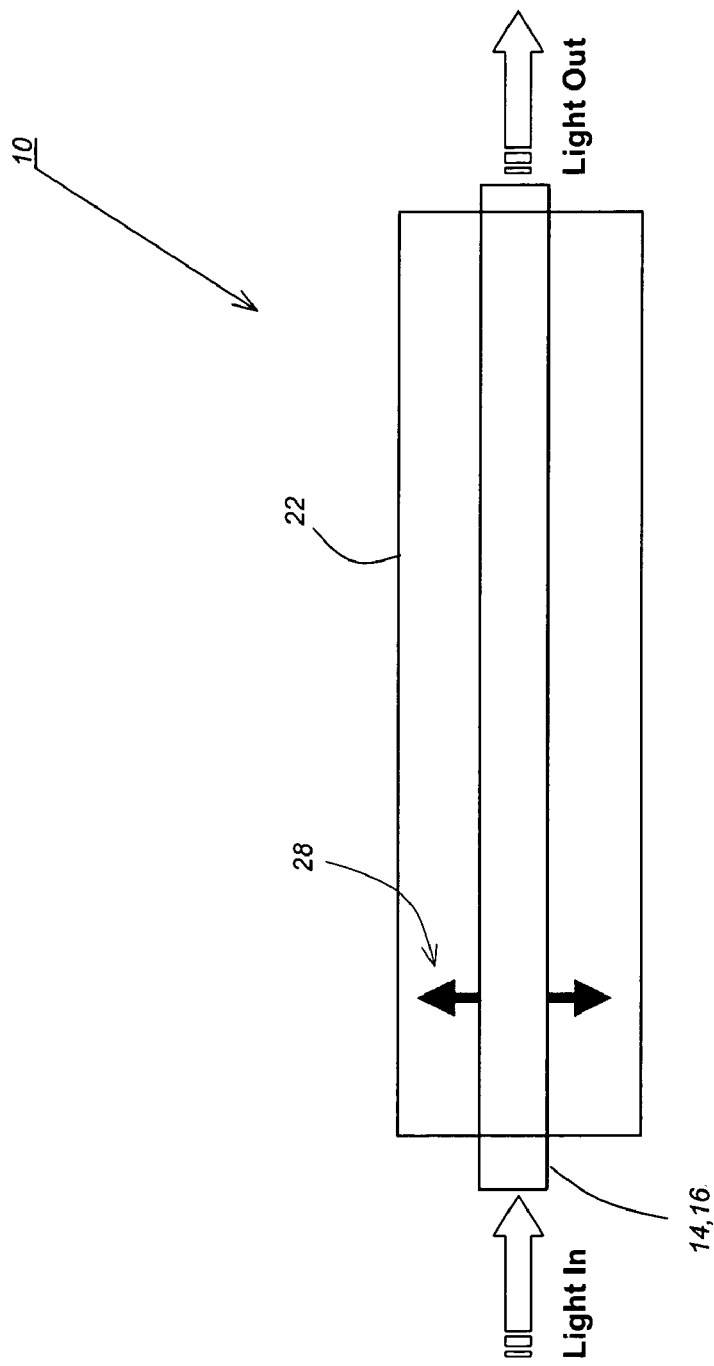
FIGS. 4a and 4b illustrate the heat dissipation improvement resulting from the invention.
Figure 4B:
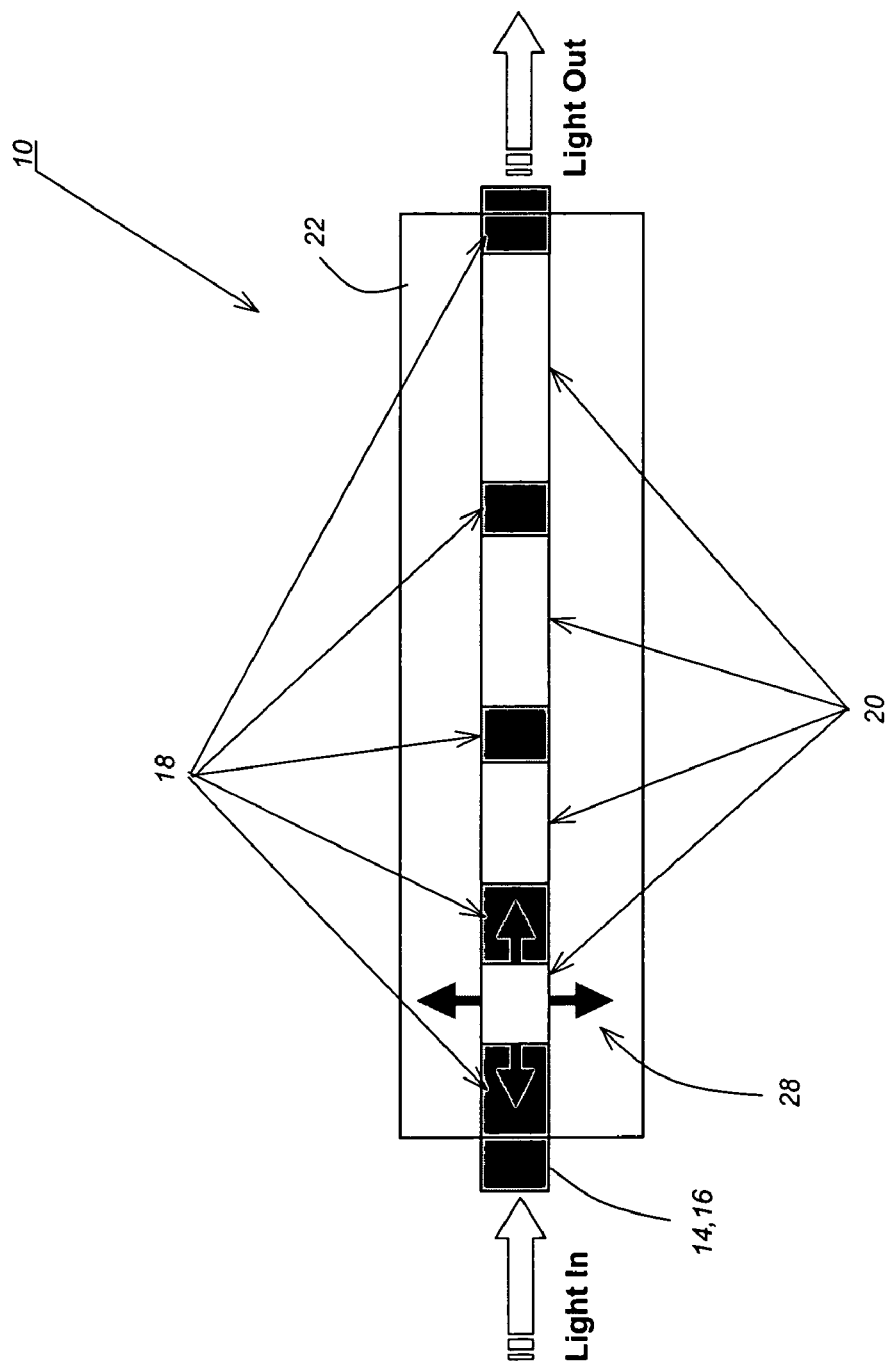

FIGS. 4a and 4b explain the principle advantage of the current invention. In a prior art device design 10 as shown in FIG. 4a, the entire length of the device 10 consists of high-absorption material. Optical power is absorbed throughout the ridge 16, producing photocurrent and therefore generating heat. Because the heat is generated everywhere along the ridge 16, there is very little heat flow 28 in the longitudinal direction of the ridge 16, and the heat is constrained to flow 28 out of the device 10 largely through a cross section plane perpendicular to the ridge 16. The heat flow 28 is effectively restricted into two dimensions.

However, in an improved device design as shown in FIG. 4b, the light absorption profile is divided into low-absorption and high-absorption segments 18, 20 along the length of the device 10. Since little light is absorbed in the low-absorption segments 18, very little heat generation occurs there. The effect of the low-absorption segments 18 is therefore to break up the heat generation of the device 10 by inserting unheated segments 18. Heat generated in the high-absorption segments 20 can now also flow 28 in a longitudinal direction into the unheated areas surrounding the low-absorption segment 18. The presence of the contact metal 22 above the low-absorption segment 18 is important in providing a low-resistance path for heat flow 28 away from the heated areas surrounding the high-absorption segment 20. The heat flow 28 is no longer restricted to a cross sectional plane, but can flow in all three dimensions. Thus, the effective thermal resistance of the absorbing segment 20 is significantly reduced due to the transition from two-dimensional to three-dimensional heat flow. The temperature increase of the segments 20 will be lower than in the case of two-dimensional heat flow.

The number of low-absorption segments 18 and high-absorption segments 20, as well as their size and distribution, can be optimized according to the value of the absorption coefficients and the light intensity passing through the device 10. For example, it may be desired to use only one low-absorption segment 18, located at the input of the device 10. It has been determined by experiment that the best performance is obtained when the low-absorption segments 18 number from 1 to 10, although other numbers of segments 18, 20 may also be used.

Figure 5:
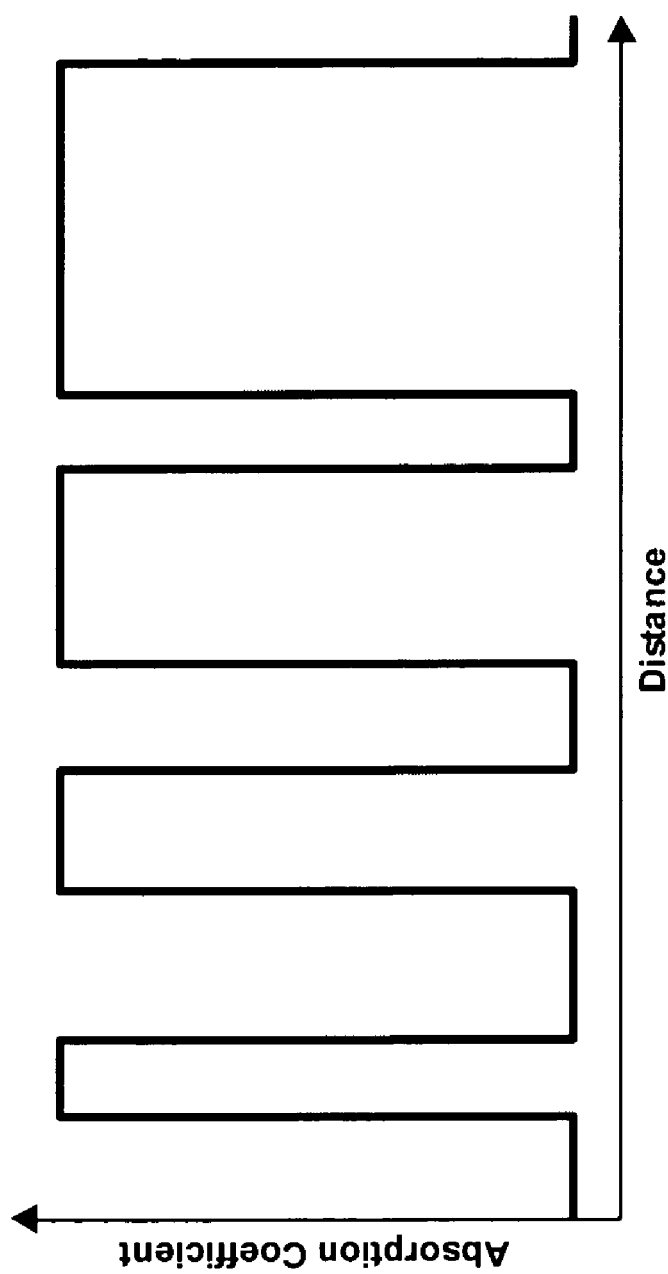
FIG. 5 is a graph that represents the absorption coefficient in the waveguide as a function of position along the ridge within the device.

Inserting more low-absorption segments 18, or making those segments 18 longer, will help to reduce the peak temperature of the device. However, a trade-off exists with device performance, as this technique will increase the total device length and therefore increase capacitance, which could compromise high-speed performance of the device 10. Therefore, it is desirable to vary the lengths of the low-absorption segments 18 and the high-absorption segments 20 axially along the device 10. At the front of the device, where the light intensity is high, it is desirable to have longer low-absorption segments 18 and shorter high-absorption segments 20, in order to take full advantage of the three-dimensional heat flow. In particular, it is desirable to have a low-absorption segment 18 at the input of the device 10, so that heat generated in the first high-absorption segment 20 can flow towards the device 10 input. Towards the back of the device 10, the high-absorption segments 20 can be longer and the low-absorption segments 18 can be shorter since the total amount of light absorbed is smaller. A low-absorption segment 18 at the end of the device 10 may be desired in order to promote three-dimensional heat flow in this section of the device 10. Typical lengths could be 2 to 30 μm for the low-absorption segments 18, and 2 to 1000 μm for the high-absorption segments 24. FIG. 5 is a graphical representation of the absorption coefficient along the waveguide 14 in a typical structure.

Figure 6:
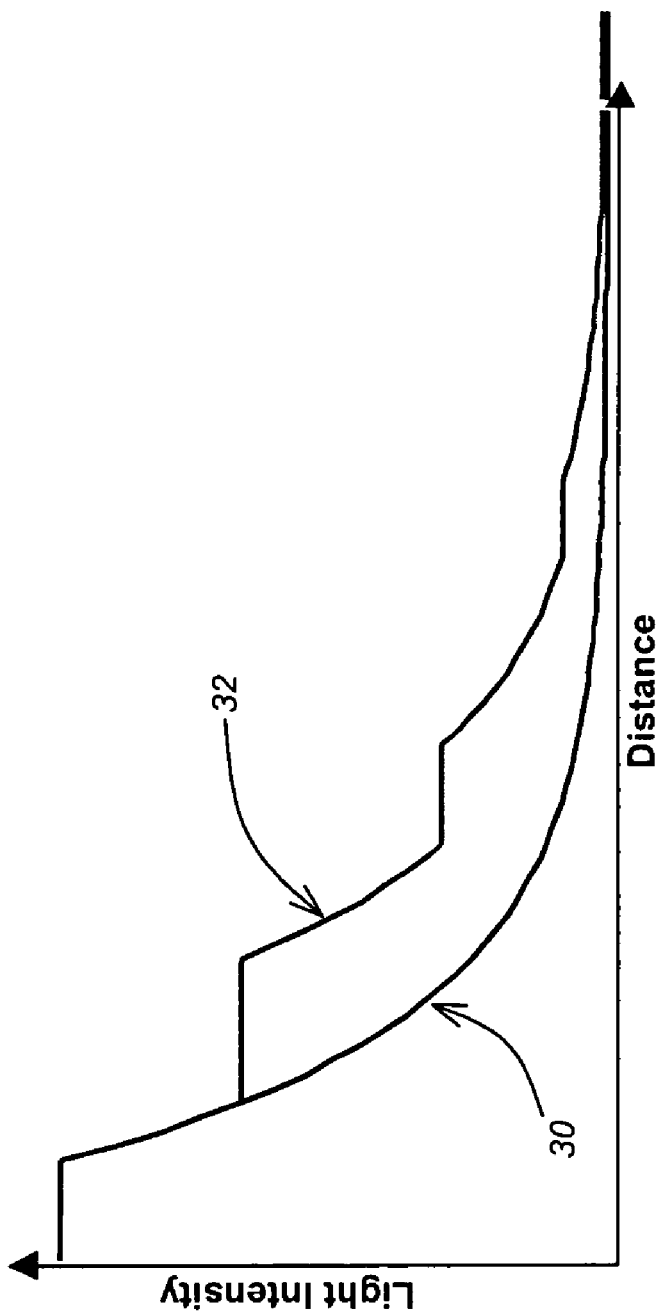
FIG. 6 is a graph that represents the light intensity as a function of position along the ridge within the device, both for a standard single-segment device and a device using a segmented absorption design.

FIG. 6 is a graph that shows the axial light intensity in the new device design as compared to the prior art design, wherein plot 30 represents a single high-absorption segment 20 and plot 32 represents distributed low- and high-absorption segments 18, 20. The light intensity decreases in the high-absorption segments 20. In low-absorption segments 18, however, the light intensity stays roughly constant indicating little absorption and therefore little photocurrent generation. Due to the segmentation, the light reaches further into the device. The total generated heat is distributed more evenly. The segmentation of the absorption length is equivalent to a smaller effective absorption coefficient at the front of the device and a higher effective absorption coefficient towards the end. The effective absorption coefficient is artificially modified over the length of the device without changing the real material properties.

Figure 7:
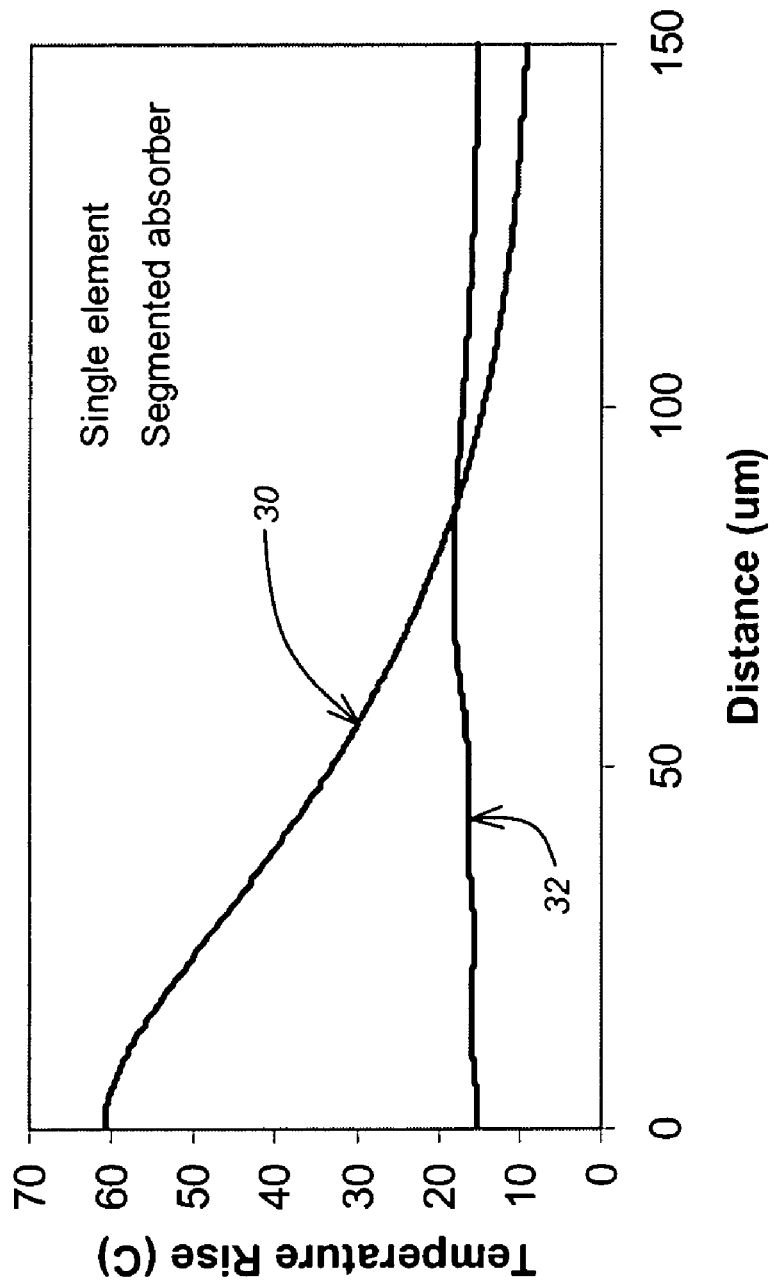
FIG. 7 is a graph that shows values of temperature rise as a function of position along the ridge within the device, both for a standard single-segment device and a device using a segmented absorption design, wherein the values are calculated using a detailed numerical model.

The local temperature rise along the ridge 16 will depend on many properties of the device 10 including the thermal conductivity of the materials, the bandgap of the waveguide 14, the input optical power and wavelength, and the operating voltage. Taking these into consideration, the distribution of high-absorption segments 20 and low-absorption segments 18 can be optimized to achieve the desired temperature profile. For example, FIG. 7 shows values of the temperature rise along the ridge 16 extracted from a detailed numerical model of operating devices, wherein plot 30 represents a single high-absorption segment 20 and plot 32 represents distributed low- and high-absorption segments 18, 20. Temperature profiles are shown for two types of devices: a profile 30 for a device 10 in which a single high-absorption region 20 lies below the metal contact 22 (of length 250 μm), and a profile 32 for an improved device in which low-absorption segments 18 and high-absorption segments 20 alternate in the area beneath the metal contact 22. The segment design for the latter device (starting from the device input) comprises the following: 10 μm low-absorption, 10 μm high-absorption, 15 μm low-absorption, 10 μm high-absorption, 15 μm low-absorption, 190 μm high-absorption. In all other respects, the two devices in the model were identical. The simulation was performed for operating conditions of 30 mW input optical power at 1545 nm, and an operating voltage of 4V DC. It is clear from FIG. 7 that the segmented absorption design leads to a much more uniform temperature distribution and a lower peak temperature. The low-absorption sections 18 improve heat flow near the front of the device, reducing the thermal runaway effects that are responsible for the large temperature rise in the device of prior art. Furthermore, optical power penetrates more deeply into the improved device, causing heating to be spread more uniformly.

Figure 8:
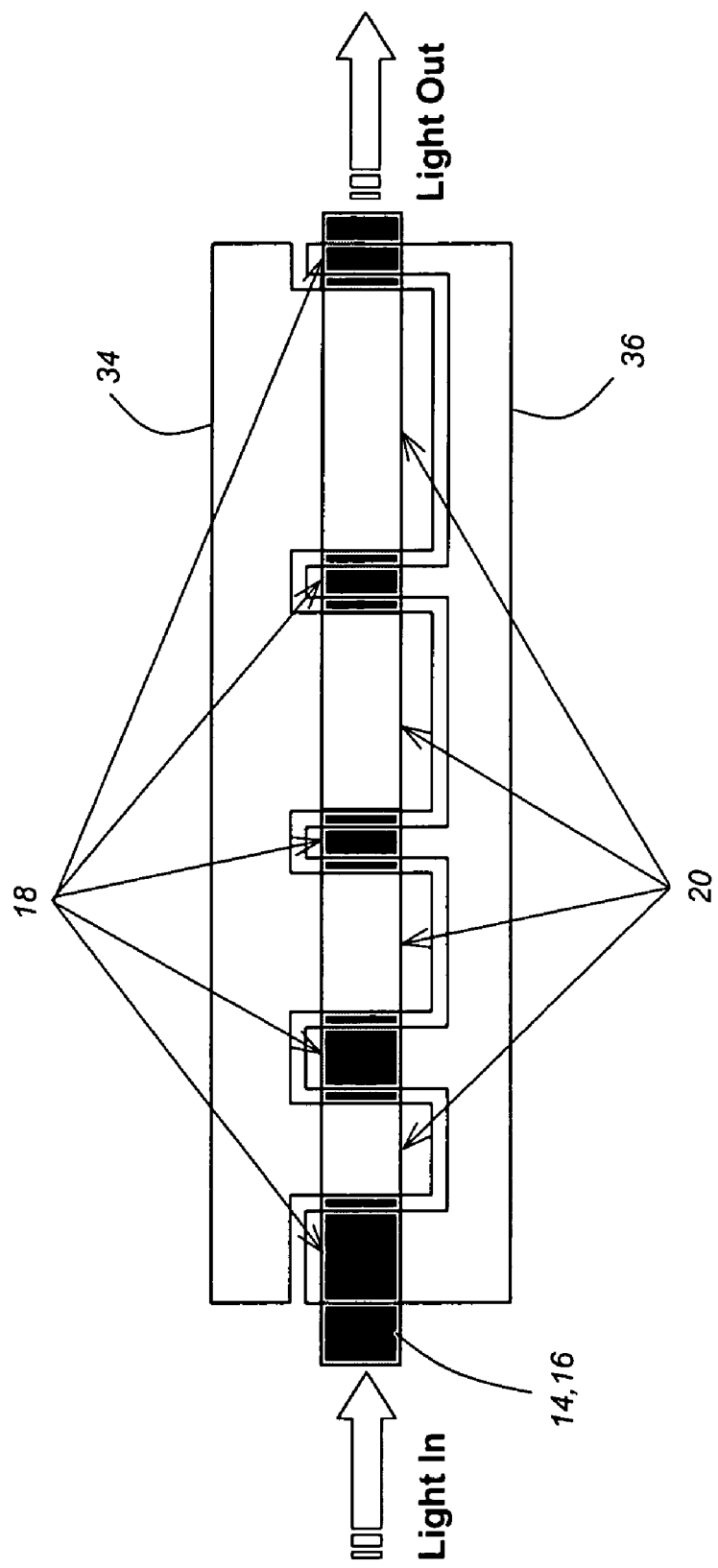
FIG. 8 illustrates a device with a segmented absorption design and separate electrodes contacting the low-absorption and high-absorption segments.

An alternate embodiment of this invention is shown in FIG. 8. In this embodiment, two separate metal electrodes 34, 36 are used. The primary metal electrode 34 contacts only the high-absorption segments 20, while the secondary metal electrode 36 contacts only the low-absorption segments 18. This design limits the area of the primary metal electrode 34 to its minimum value, which may be desirable in order to achieve low capacitance for this electrode 34. The role of the secondary metal electrode 36 is to aid heat spreading by placing a metal pattern on the low-absorption sections 18 in close proximity to the heat sources in the high-absorption sections 20.

Another embodiment of this design is realized by restricting proton implantation to occur only in the narrow separation between the two electrodes 34, 36, rather than along the entire length of the ridge cladding sections 24. In this embodiment, the presence of the secondary electrode 36 adds considerable flexibility to the device operation. The voltage applied to the secondary electrode 36 can be used to control the absorption coefficient in the low-absorption sections 18, allowing the overall absorption profile in the device to be adjusted at will.

Other techniques may also be used to define the low-absorption sections 18 and high-absorption sections 20. For example, if the waveguide 14 is comprised of quantum well material, then selective-area disordering of the quantum wells may be used to define the low-absorption segments 18 and high-absorption segments 20 of the waveguide 14. Disordering of a quantum well waveguide has been demonstrated as an effective technique that can shift the onset wavelength of optical absorption. [11],[12] In this embodiment, a single metal electrode 22 may be used on top of the entire device 10, as shown in FIG. 1. Because implantation is not used, the material is identical in the regions 24 and 26 of the ridge 16. The voltage applied to the waveguide 14 is therefore constant throughout the device 10. The high-absorption segments 20 and low-absorption segments 18 are produced as a result of the quantum-well disordering procedures, which locally change the light absorption of the waveguide 14 as a function of voltage.

Figure 9:
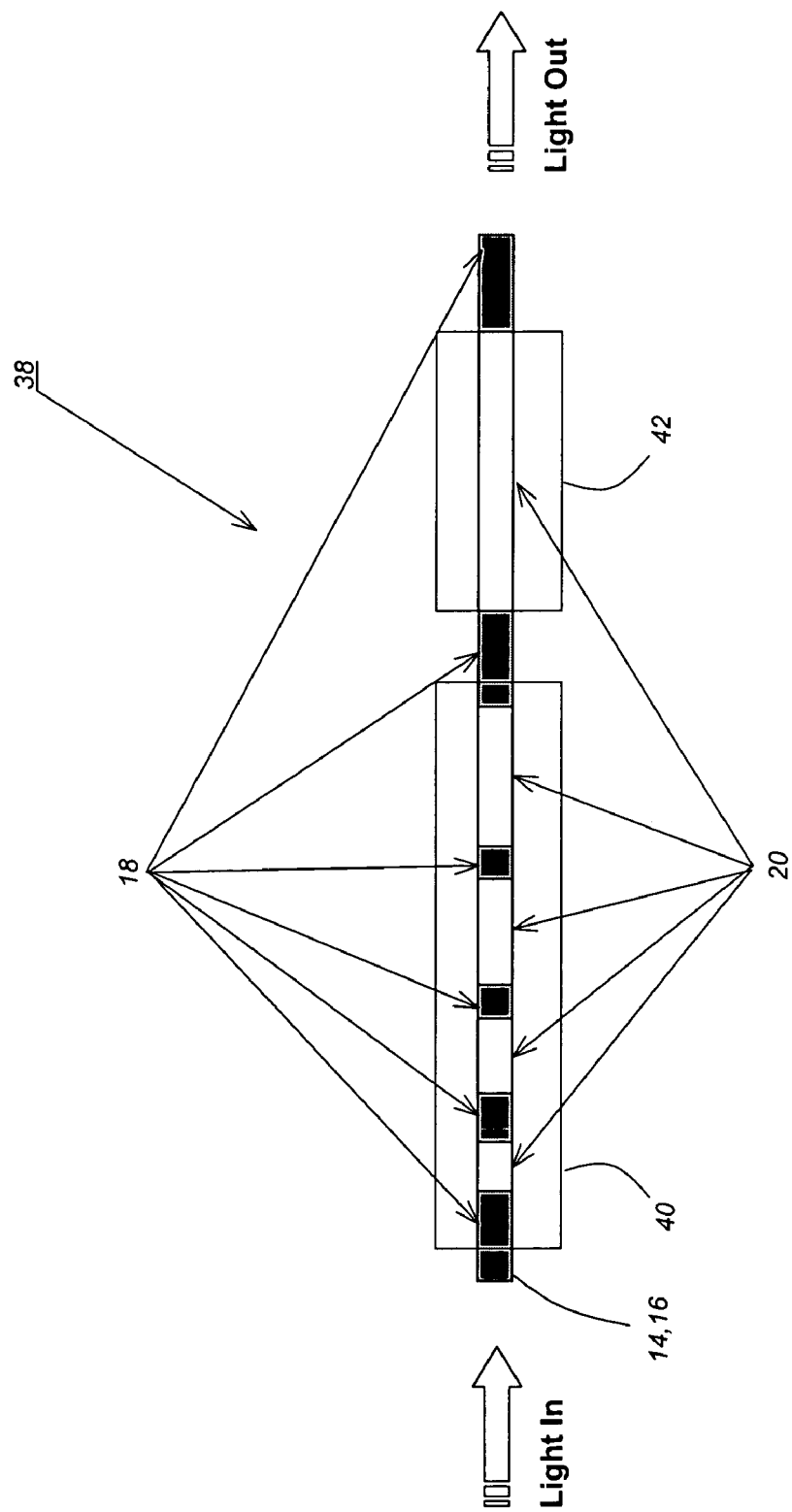
FIG. 9 illustrates a dual-stage electroabsorption modulator in which a segmented absorption design is used in the first stage.

The segmented absorber concept may be applied in numerous embodiments besides that shown in FIGS. 1 to 3. For example, the device 10 could be part of a multi-stage electro-absorption modulator (EAM). In tandem or dual stage electro-absorption modulators, two modulator sections are linked in series on a single ridge. [13], [14] The use of two or more modulator sections has advantages in allowing independent control of attenuation and phase shift. FIG. 9 is a diagram of a dual-stage electro-absorption modulator 38 in which the present invention has been applied to the first modulator stage 40, while the second stage 42 is a standard single-element modulator. Alternatively, the segmented absorber design might be applied to the second stage 42 of the modulator, or to both stages 40,42.

A tandem or dual-stage modulator can also be achieved using a single segmented absorber design with two electrodes as shown in FIG. 8. As described above, if implantation is limited to the region between the two electrodes 34, 36, then the voltage on these electrodes can be used to independently control the absorption coefficients in the segments 18 and 20. A tandem or dual stage electro-absorption modulator is thus realized by biasing the primary electrode 34 to control light attenuation and the secondary electrode 36 to control phase shift.

Figure 10:
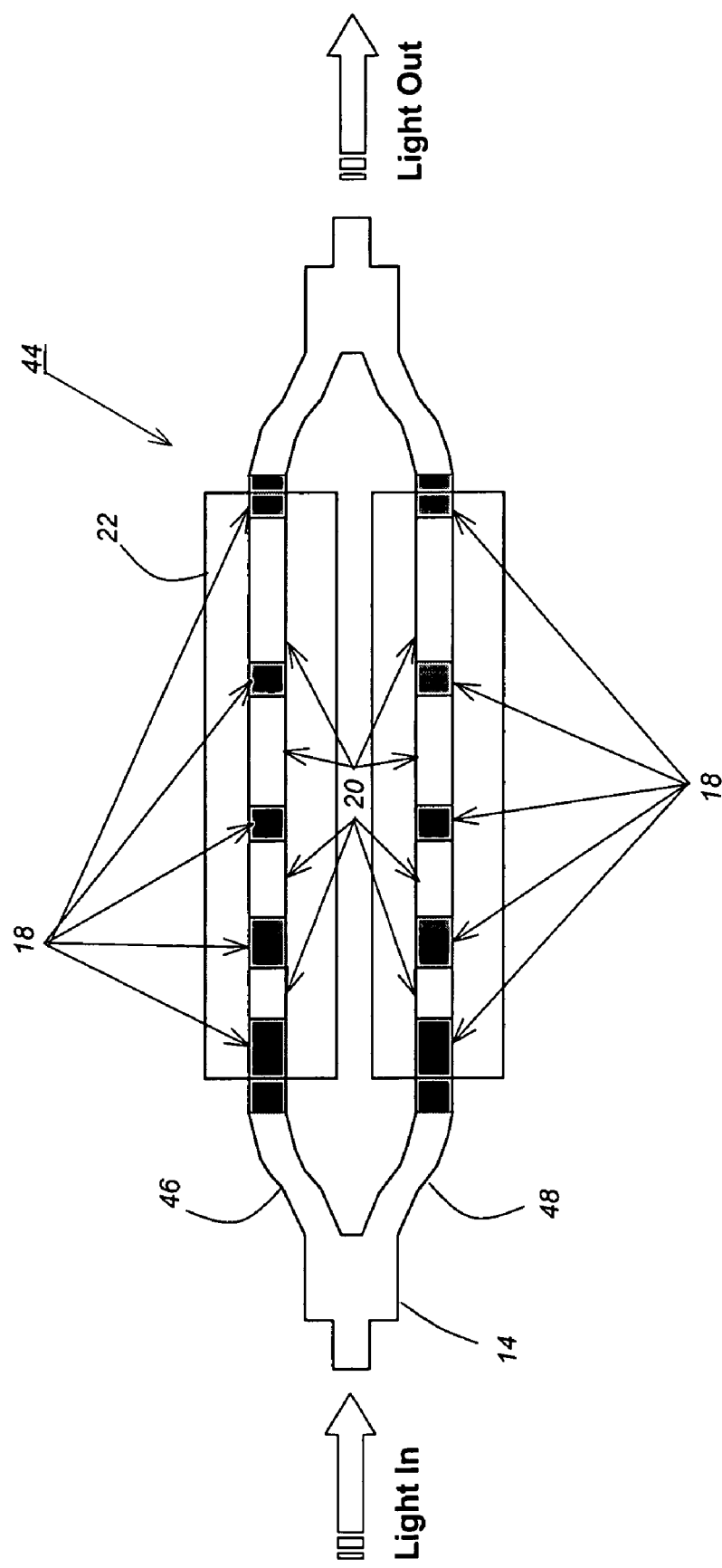
FIG. 10 illustrates a Mach-Zender interferometer in which a segmented absorption design is used in both arms.

The present invention is also applicable to other waveguide device designs where photocurrent is produced and it is desirable to limit the effects of self-heating. For example, FIG. 10 shows an example where the device 10 is part of a Mach-Zender interferometer 44. In a Mach-Zender interferometer 44, light is split between the two arms 46, 48 and then recombines again; the intensity of the output light can be modulated by altering the properties of one or both arms 46, 48 to create an interference effect. Photocurrent is generated in the arms 46, 48 when they are reverse-biased, and this can lead to significant heating and compromised device performance. The use of a segmented absorption design, with low-absorption and high-absorption segments 18, 20, can be applied in one or both arms 46, 48 (as shown) to address this problem.

Figure 11:
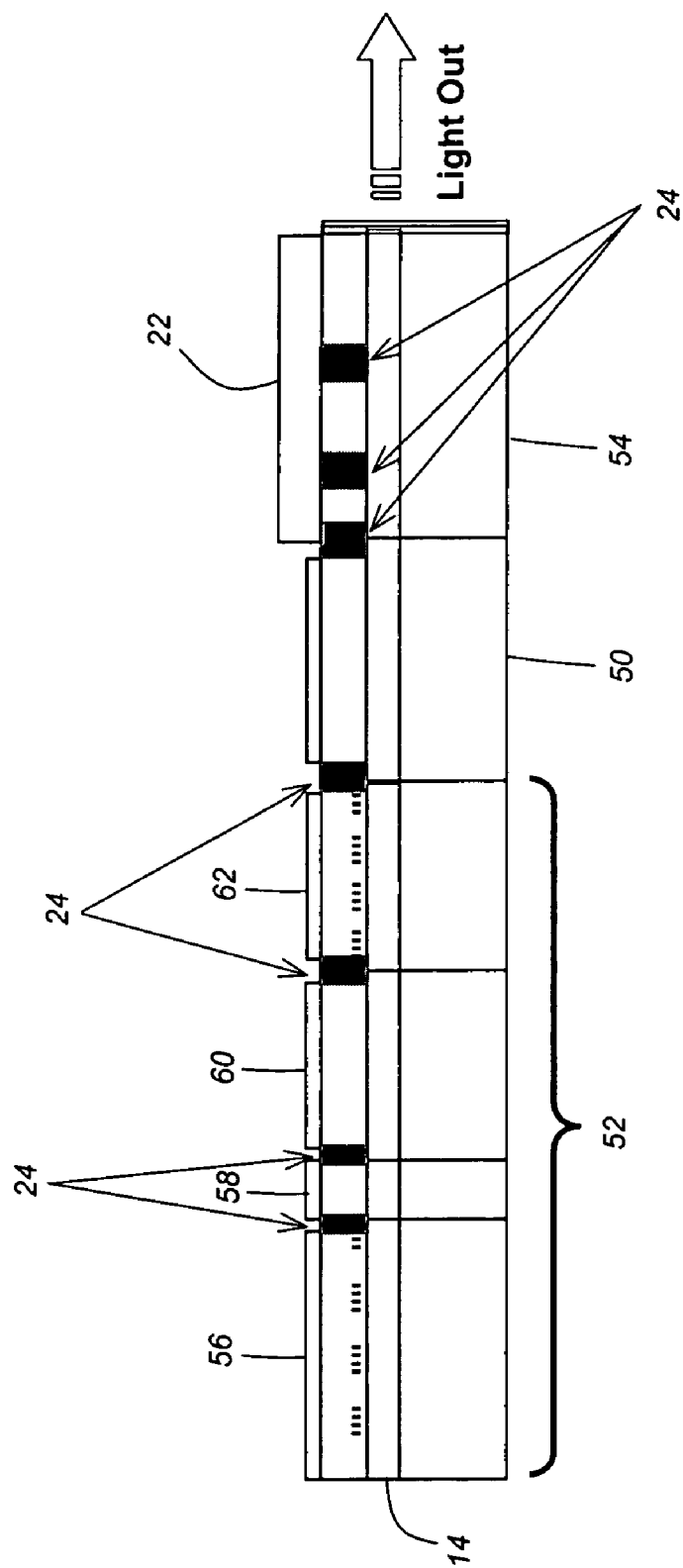
FIG. 11 illustrates the cross-section, along the ridge, of a monolithically integrated chip including a widely tunable laser and a modulator structure using a segmented absorption design.

Another example is the monolithic integration of electro-absorption modulators or Mach-Zender modulators with semiconductor laser diodes (either fixed wavelength or tunable in nature), semiconductor optical amplifiers, mode size converters, or photodetectors. [2] This invention can be applied to the modulator or photodetector sections of such devices, and FIG. 11 shows such an integrated structure, with a semiconductor optical amplifier 50 included between a tunable laser diode 52 and modulator 54. To simplify processing of such devices, the proton implanted areas 24 needed to produce non-absorbing segments 18 in the modulator 54 can be produced in the same step that is used to isolate the various sections of the integrated device. In the specific embodiment shown in FIG. 11, these sections comprise the rear mirror, phase, gain and front mirror sections 56, 58, 60, 62 of the integrated laser diode 52, as well as the semiconductor optical amplifier 50, and the modulator 54.

REFERENCES

The following references are incorporated by reference herein:

[1] The group of U.S. patents identified as:

U.S. Pat. No. 6,628,690, issued Sep. 30, 2003, to Gregory A. Fish and Larry A. Coldren, entitled "OPTO-ELECTRONIC LASER WITH INTEGRATED MODULATOR,"

U.S. Pat. No. 6,614,819, issued Sep. 2, 2003, to Gregory A. Fish and Larry A. Coldren, entitled "METHOD OF CONVERTING AN OPTICAL WAVELENGTH WITH AN OPTO-ELECTRONIC LASER WITH INTEGRATED MODULATOR," and U.S. Pat. No. 6,574,259, issued Jun. 3, 2003, to Gregory A. Fish and Larry A. Coldren, entitled "METHOD OF MAKING AN OPTO-ELECTRONIC LASER WITH INTEGRATED MODULATOR."

[2] T. Wipiejewski, Y. A. Akulova, C. Schow, A. Karim, S. Nakagawa, P. Kozodoy, G. Fish, J. DeFranco, A. Dahl, M. Larson, D. Pavinski, T. Butrie, L. A. Coldren, "Monolithic Integration of a Widely Tunable Laser Diode with a High Speed Electro-Absorption Modulator," $52^{nd}$ ECTC, San Diego, May 2002.

[3] M. Allard, R. A. Masut, M. Boudreau, "Temperature determination in optoelectronic waveguide modulators," Journal of Lightwave Technology, vol. 18, pp. 813–818, 2000.

[4] Z. Bian, J. Christofferson, A. Shakouri, P. Kozodoy, "High-power operation of electro-absorption modulators," Applied Physics Letters, vol. 83, pp. 3605–3607, 2003.

[5] H. Tanaka, M. Horita, Y. Matsushima, Y. Takahashi, "Temperature dependence and input optical power tolerance of an InGaAsP electro-absorption modulator module," Optical & Quantum Electronics, vol. 28, pp.605–612, 1996.

[6] T. Wipiejewski, M. G. Peters, D. B. Young, B. J. Thibeault, L. A. Coldren, "Improved Performance of Vertical-Cavity Surface-Emitting Laser Diodes with Au-Plated Heat Spreading Layer," Electronics Lett., vol. 31, pp. 279–281, 1995.

[7] A. Nespola, T. Chau, M. C. Wu, G. Ghione, "Analysis of failure mechanisms in velocity-matched distributed photodetectors," IEE Proc. Optoelectron., vol. 146, pp. 25–30, 1999.

[8] S. Jasmin, N. Vodjdani, J.-C. Renaud, A. Enard, "Diluted- and distributed-absorption microwave waveguide photodiodes for high efficiency and high power," IEEE Transactions on Microwave Theory and Techniques, vol. 45, pp. 1337–1341, 1997.

[9] S. Murthy, T. Jung, T. Chau, M. C. Wu, D. L. Sivco, A. Y. Cho, "A novel monolithic distributed traveling-wave photodetector with parallel optical feed," IEEE Photonics Technology Letters, vol. 12, p. 681–683, 2000.

[10] J.-W. Shi, C.-K. Sun, "Theory and design of a tapered line distributed photodetector," Journal of Lightwave Technology, vol. 20, pp. 1942–1950, 2002.

[11] A. Hamoudi, E. V. K. Rao, Ph. Krauz, A. Ramdane, A. Ougazzaden, D. Robein, H. Thibierge, "Controlled disordering of compressively strained InGaAsP multiple quantum wells under SiO:P encapsulant and application to laser-modulator integration," Journal of Applied Physics, vol. 78, pp. 5638–5641, 1995.

[12] V. Aimez, J. Beauvais, J. Beerens, D. Morris, H. S. Lim, B.-S. Ooi, "Low-energy ion-implantation-induced quantum-well intermixing," IEEE Journal of Selected Topics in Quantum Electronics, vol. 8, pp. 870–879, 2002.

[13] M. Claassen, W. Harth, B. Stegmueller, "Two-section electro-absorption modulator with negative chirp at low insertion loss," Electronics Lett., vol. 32, pp. 2121–2122, 1996.

[14] B. Mason et al.: "40-Gb/s Tandem Electro-absorption Modulator," IEEE Photon. Techn. Lett., vol. 14, pp. 27–29, 2002.

CONCLUSION

This concludes the description of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A photonic device having an intermittent light absorption profile along a waveguide, wherein the light absorption profile is divided into low-absorption and high-absorption segments that are distributed axially along the waveguide in order to decrease a maximum local temperature in the device.

2. The device of claim 1, wherein the low-absorption segments' lengths vary along the device.

3. The device of claim 1, wherein the low-absorption segments number from 1 to 10.

4. The device of claim 1, wherein the high-absorption segments' lengths vary along the device.

5. The device of claim 1, wherein a low-absorption segment is located at an input of the device and is followed by at least one high-absorption segment.

6. The device of claim 1, wherein a low-absorption segment is located at an output of the device and is preceded by at least one high-absorption segment.

7. The device of claim 1, further comprising one or more metal electrodes on a ridge cladding layer on the waveguide, wherein the electrodes cover an entire length of the device.

8. The device of claim 7, wherein the absorption segments include one or more high-absorption segments and one or more low-absorption segments, and separate ones of the metal electrodes contact the high-absorption and low-absorption segments.

9. The device of claim 8, wherein voltages applied to the electrodes are adjusted to produce the high-absorption segments and low-absorption segments of the device.

10. The device of claim 9, wherein separate ones of the electrodes are used as elements of a dual stage electro-absorption modulator.

11. The device of claim 1, wherein the waveguide is comprised of a bulk material and the Franz-Keldysh effect is used to change the material's absorption coefficient or index of refraction with an applied electrical field.

12. The device of claim 1, wherein the waveguide contains quantum well material and the Quantum-Confined-Stark effect is used to change the material's absorption coefficient or index of refraction with an applied electrical field.

13. The device of claim 1, wherein the absorption segments include one or more low-absorption segments that are defined by proton implantation of a ridge cladding layer.

14. The device of claim 13, wherein the absorption segments include one or more high-absorption segments that are defined by a lack of proton implantation in the ridge cladding layer.

15. The device of claim 1, wherein the waveguide is a quantum well waveguide, the absorption segments include one or more high-absorption segments and one or more low-absorption segments, and the high-absorption segments and low-absorption segments are defined by selective-area disordering of the quantum well waveguide.

16. The device of claim 1, wherein the device is an electro-absorption modulator.

17. The device of claim 1, wherein the device is part of a multi-stage modulator.

18. The device of claim 1, wherein the device is part of a Mach-Zender interferometer.

19. The device of claim 1, wherein the device is a photodetector.

20. The device of claim 1, wherein the device is monolithically integrated with a semiconductor laser diode.

21. The device of claim 20, wherein the semiconductor laser diode is a wavelength-tunable semiconductor laser diode.

22. The device of claim 20, wherein the device is monolithically integrated with other optical elements selected from a group comprising semiconductor optical amplifiers, mode size converters, and photodetectors.

23. A method of fabricating a photonic device having an intermittent light absorption profile along a waveguide, wherein the light absorption profile is divided into low-absorption and high-absorption segments that are distributed axially along the waveguide in order to decrease a maximum local temperature in the device, the method comprising:
creating a plurality of different absorption segments that are distributed axially along a waveguide of the device in order to decrease a maximum local temperature in the device, wherein a photo-induced current generates heat in the device, and the absorption segments decrease the heat.

24. The method of claim 23, wherein the low-absorption segments' lengths vary along the device.

25. The method of claim 23, wherein the low-absorption segments number from 1 to 10.

26. The method of claim 23, wherein the high-absorption segments' lengths vary along the device.

27. The method of claim 23, wherein a low-absorption segment is located at an input of the device and is followed by at least one high-absorption segment.

28. The method of claim 23, wherein a low-absorption segment is located at an output of the device and is preceded by at least one high-absorption segment.

29. The method of claim 23, further comprising creating one or more metal electrodes on a ridge cladding layer on the waveguide, wherein the electrodes cover the entire length of the device.

30. The method of claim 29, wherein the absorption segments include one or more high-absorption segments and one or more low-absorption segments, and separate ones of the metal electrodes contact the high-absorption and low-absorption segments.

31. The method of claim 30, wherein voltages applied to the electrodes are adjusted to produce the high-absorption segments and low-absorption segments of the device.

32. The method of claim 31, wherein separate ones of the electrodes are used as elements of a dual stage electro-absorption modulator.

33. The method of claim 23, wherein the waveguide is comprised of a bulk material and the Franz-Keldysh effect is used to change the material's absorption coefficient or index of refraction with an applied electrical field.

34. The method of claim 23, wherein the waveguide contains quantum well material and the Quantum-Confined-Stark effect is used to change the material's absorption coefficient or index of refraction with an applied electrical field.

35. The method of claim 23, wherein the absorption segments include one or more low-absorption segments that are defined by proton implantation of a ridge cladding layer.

36. The method of claim 35, wherein the absorption segments include one or more high-absorption segments that are defined by a lack of proton implantation in the ridge cladding layer.

37. The method of claim 23, wherein the waveguide is a quantum well waveguide, the absorption segments include one or more high-absorption segments and one or more low-absorption segments, and the high-absorption segments and low-absorption segments are defined by selective-area disordering of the quantum well waveguide.

38. The method of claim 23, wherein the device is an electro-absorption modulator.

39. The method of claim 23, wherein the device is part of a multi-stage modulator.

40. The method of claim 23, wherein the device is part of a Mach-Zender interferometer.

41. The method of claim 23, wherein the device is a photodetector.

42. The method of claim 23, wherein the device is monolithically integrated with a semiconductor laser diode.

43. The method of claim 42, wherein the semiconductor laser diode is a wavelength-tunable semiconductor laser diode.

44. The method of claim 42, wherein the device is monolithically integrated with other optical elements selected from a group comprising semiconductor optical amplifiers, mode size converters, and photodetectors.

* * * * *